(12) United States Patent
Makuni et al.

(10) Patent No.: US 10,657,040 B2
(45) Date of Patent: May 19, 2020

(54) STORAGE DEVICE AND DATA MANAGEMENT METHOD OF STORAGE DEVICE

(71) Applicant: BUFFALO INC., Nagoya-shi (JP)

(72) Inventors: Kazuki Makuni, Nagoya (JP); Takayuki Okinaga, Nagoya (JP); Shuichiro Azuma, Nagoya (JP); Yu Nakase, Nagoya (JP)

(73) Assignee: BUFFALO INC., Nagoya-Shi (JP)

( * ) Notice: Subject to any disclaimer, the term of this patent is extended or adjusted under 35 U.S.C. 154(b) by 86 days.

(21) Appl. No.: 16/000,089

(22) Filed: Jun. 5, 2018

(65) Prior Publication Data

US 2018/0357158 A1 Dec. 13, 2018

(30) Foreign Application Priority Data

Jun. 7, 2017 (JP) ................................ 2017-112177

(51) Int. Cl.
*G06F 12/00* (2006.01)
*G06F 12/02* (2006.01)
*G06F 12/1009* (2016.01)

(52) U.S. Cl.
CPC ...... *G06F 12/0246* (2013.01); *G06F 12/1009* (2013.01); *G06F 2212/1024* (2013.01); *G06F 2212/2022* (2013.01); *G06F 2212/7201* (2013.01); *G06F 2212/7204* (2013.01); *G06F 2212/7205* (2013.01); *G06F 2212/7207* (2013.01)

(58) Field of Classification Search
CPC ............. G06F 12/0246; G06F 12/1009; G06F 2212/1024; G06F 2212/2022; G06F 2212/7201; G06F 2212/7204; G06F 2212/7205; G06F 2212/7207
See application file for complete search history.

(56) References Cited

U.S. PATENT DOCUMENTS

2008/0189476 A1* 8/2008 Ishimoto ............. G06F 12/0246
711/103

FOREIGN PATENT DOCUMENTS

| JP | H11-085589 A | 3/1999 |
| JP | 2004/094429 A | 3/2004 |
| JP | 2008-146255 A | 6/2008 |
| JP | 2008-191930 A | 8/2008 |

* cited by examiner

*Primary Examiner* — Shawn X Gu
(74) *Attorney, Agent, or Firm* — Xsensus LLP

(57) ABSTRACT

A storage device including a flash memory, and circuitry that manages a logical address and a physical address so as to be converted using a conversion table, writes a logical address and old and new information indicating a timing when the data is written, into the physical address together with the data, writes at least latest old and new information of the old and new information written in the block into a predetermined page of the block, and reestablishes the conversion table by arranging the logical address recorded in each page included in the block and the physical address corresponding to the logical address in association with each other, in chronological order of the latest old and new information read out from each block of the flash memory, at a predetermined reestablishment timing for performing reestablishment of the conversion table.

20 Claims, 14 Drawing Sheets

FIG. 4

| | DATA PART | | | | REDUNDANT PART | | | |
|---|---|---|---|---|---|---|---|---|
| | | | | | LOGICAL ADDRESS A | LOGICAL ADDRESS B | LOGICAL ADDRESS C | LOGICAL ADDRESS D | OLD AND NEW INFORMATION |
| Page 1 | 4KB | 4KB | 4KB | 4KB | E | F | G | H | a |
| Page 2 | 4KB | 4KB | 4KB | 4KB | I | J | K | L | b |
| Page 3 | 4KB | 4KB | 4KB | 4KB | | | | | c |
| ... | | | | | ... | | | | |
| Page 511 | 4KB | 4KB | 4KB | 4KB | S | T | U | V | y |
| Page 512 | LATEST OLD AND NEW INFORMATION IN BLOCK | | | | | | | | |

NBmx

FIG. 5

CONVERSION TABLE CT

| LOGICAL ADDRESS LAD | PHYSICAL ADDRESS | |
| --- | --- | --- |
| | BLOCK | PAGE |
| LAD1 | B1 | P1 |
| LAD2 | B1 | P3 |
| LAD3 | B1 | P244 |
| LAD4 | B1 | P510 |
| LAD5 | B5 | P1 |
| LAD6 | B5 | P4 |
| LAD7 | B5 | P16 |
| LAD8 | B12 | P1 | ← CK
| LAD9 | B5 | P65 |
| LAD10 | B5 | P117 |
| LAD11 | | |
| | | |
| | | |

IN FLASH MEMORY

| BLOCK NUMBER | OLD AND NEW INFORMATION |
|---|---|
| 1 | N/A |
| 2 | 255 |
| 3 | 17 |
| 4 | 1031 |
| 5 | 7 |

| | |
|---|---|
| 2045 | 564 |
| 2046 | 46 |
| 2047 | N/A |
| 2048 | 1853 |

WORK TABLE WT

| BLOCK NUMBER | OLD AND NEW INFORMATION |
|---|---|
| 2 | 255 |
| 3 | 17 |
| 4 | 1031 |
| 5 | 7 |

| | |
|---|---|
| 2045 | 564 |
| 2046 | 46 |
| 2048 | 1853 |

SORTED WORK TABLE WTS

| BLOCK NUMBER | OLD AND NEW INFORMATION |
|---|---|
| 5 | 7 |
| 3 | 17 |
| 2046 | 46 |

| | |
|---|---|
| 2 | 255 |
| 2045 | 564 |

| | |
|---|---|
| 4 | 1031 |
| 2048 | 1853 |

FIG. 10

DATA IN BLOCK B5

| PAGE | ACTUAL DATA | LOGICAL ADDRESS | OLD AND NEW INFORMATION |
|---|---|---|---|
| P1 | DATA1 | LAD5 | 5 |
| P2 | DATA2 | LAD6 | 6 |
| P3 | DATA3 | LAD7 | 7 |
| P4 | DATA4 | LAD8 | 8 |
| P5 | DATA5 | LAD9 | 9 |
| P6 | DATA6 | LAD10 | 10 |
|  |  |  |  |

DATA IN BLOCK B12

| PAGE | ACTUAL DATA | LOGICAL ADDRESS | OLD AND NEW INFORMATION |
|---|---|---|---|
| P1 | DATA4 | LAD8 | 154 |
| P2 | DATAm | LADm | 899 |

FIG. 14

| | DATA PART | | | | | | REDUNDANT PART | | | |
|---|---|---|---|---|---|---|---|---|---|---|
| | | | | | | | LOGICAL ADDRESS A | LOGICAL ADDRESS B | LOGICAL ADDRESS C | LOGICAL ADDRESS D | OLD AND NEW INFORMATION |
| Page 1 | 4KB | 4KB | 4KB | 4KB | 4KB | 4KB | E | F | G | H | a |
| Page 2 | 4KB | 4KB | 4KB | 4KB | 4KB | 4KB | I | J | K | L | b |
| Page 3 | 4KB | 4KB | 4KB | 4KB | 4KB | 4KB | | | | | c |
| ... | | | | | | | | ... | | | |
| Page 511 | 4KB | 4KB | 4KB | 4KB | 4KB | 4KB | S | T | U | V | y |
| Page 512 | | | | DIGEST DATA | | | | | | | |

STORAGE DEVICE AND DATA MANAGEMENT METHOD OF STORAGE DEVICE

CROSS-REFERENCE TO RELATED APPLICATION

This application claims priority from Japanese Patent Application No. 2017-112177, filed on Jun. 7, 2017, the entire subject matter of which is incorporated herein by reference.

TECHNICAL FIELD

The present disclosure relates to data management in a storage device using a flash memory.

BACKGROUND

In recent years, a capacity of a semiconductor storage device using a flash memory has been increased. The flash memory is used for a memory card and a USB memory and is also used instead of a magnetic recording-type storage device such as a hard disk drive. Usually, data is stored into the storage device by a file system, which is provided by an OS (abbreviation of Operation System) or a dedicated application. In order to convert a logical address that is treated by the file system into a physical address of the flash memory in which data is actually stored, a conversion table in which both addresses are associated with each other is used. Therefore, when a file application table or the like, which is an example of the conversion table, is damaged due to any reason, even though the data remains in the flash memory, the file system may not read out stored contents thereof.

For this reason, in the related art, the logical address is stored together with the data so that the data saved in the storage device can be read out even though the conversion table, in which the logical address and the physical address are associated with each other, is damaged. By doing so, even though the conversion table is damaged, a region in which the data is stored is read out, so that it is possible to obtain the logical address of the data and to thus reestablish the data (refer to Patent Documents 1 and 2).

Also, in the flash memory, when correcting the data, corrected data is written in a new region (a different block or a different page in the flash memory), instead of being overwritten in the same region as the data before correction. For this reason, the data corresponding to the same logical address is stored in a plurality of regions in the flash memory. Therefore, in JP-A-H11-85589, a sequence number, which is updated whenever writing into a new block is performed, is recorded together with the data. By doing so, when there are blocks having the same logical address recorded therein, the sequence numbers recorded in both the blocks are compared and the block having a new sequence number is registered in the table in which the logical address and the physical address are associated with each other, so that the data is reestablished. Also in JP-A-2008-146255, the similar processing is performed by using a cycle counter.

However, according to the above technology, it is necessary to read out the entire data so as to reestablish the stored data, so that a long time is needed for the reestablishment. Further, according to the technology disclosed in Patent Document 1, it is necessary to read out the data of the entire blocks so as to determine whether the same logical address as the logical address read out from any block is recorded in other blocks. Also, according to the technology disclosed in Patent Document 2, since the cycle counter is incremented for the first time at a point of time at which the writing into all the blocks is completed, a problem having occurred before the writing into the entire blocks is completed may cause a trouble in the reestablishment of the data.

SUMMARY

According to one illustrative aspect of the disclosure, there may be provided a storage device configured to be accessed using a logical address by a host device, the storage device comprising: a flash memory configured to erase data stored as a non-volatile data block by block, the block comprising a plurality of pages, and to write or read out the data page by page; and circuitry configured to: manage a logical address corresponding to the data to be written page by page into the flash memory and a physical address to be managed in association with the block and the page so that the logical address and the physical address can be converted using a conversion table, the data being written into the physical address; when writing the data into a predetermined physical address of the flash memory, write a logical address, which is to be stored in the conversion table in association with the physical address, and old and new information, which indicates a timing when the data is written, into the physical address allotted page by page together with the data; when writing into the plurality of pages allotted to the block is completed, write at least latest old and new information of the old and new information written in the block into a predetermined page of the block; and reestablish the conversion table by arranging the logical address recorded in each page included in the block and the physical address corresponding to the logical address in association with each other, in order from the block in which the latest old and new information read out from each block of the flash memory indicates a first timing at which the data was written to the block in which the latest old and new information indicates a second timing at which the data was written, the second timing being newer than the first timing, at a predetermined reestablishment timing for reestablishing of the conversion table.

The above storage device is configured to read out the latest old and new information from each block of the flash memory, to read out the logical address registered in each page included in each block in chronological order of the latest old and new information of each block, and to arrange the physical address corresponding to the logical address in accordance with the logical address at the reestablishment timing, thereby reestablishing the conversion table. Accordingly, it is possible to easily reestablish the conversion table with the simple processing. In the meantime, when the storage device is used for the first time, whenever data is recorded in the flash memory, a correspondence relation between the logical address and the physical address is recorded, so that the conversion table is gradually prepared. In the specification, the configuration of constituting the conversion table each time the data is written is referred to as 'preparing the conversion table'. In the meantime, the reestablishment of the conversion table means preparing the conversion table from the data recorded in the flash memory.

According to another illustrative aspect of the disclosure, a storage device configured to be accessed using a logical address by a host device, the storage device comprising: a flash memory configured to erase data stored as a non-volatile data block by block, the block comprising a plurality of pages, and to write or read out the data page by page; and circuitry configured to: manage a logical address corresponding to the data to be written page by page into the flash memory, a physical address to be managed in association with the block and the page, and old and new information, which indicates a timing when the data is written, by using a conversion table, the data being written into the physical address; when writing the data into a predetermined physical address of the flash memory, write a logical address, which is to be stored in the conversion table in association with the physical address, and the old and new information, which is to be stored in the conversion table, into the physical address together with the data; when inactivating the storage device, record the conversion table into a predetermined region of the flash memory; and when it is not determined that the conversion table recorded in the predetermined region of the flash memory is normal, compare the old and new information, which is recorded page by page or block by block in the flash memory and corresponds to each logical address, and the old and new information, which is included in the conversion table recorded in the flash memory and corresponds to each logical address, and reestablish the conversion table.

When it is not determined that the conversion table recorded in the predetermined region of the flash memory is normal, the storage device compares the old and new information of each logical address recorded page by page or block by block in the flash memory and the old and new information of each logical address of the conversion table recorded in the flash memory, thereby reestablishing the conversion table. Accordingly, even when the same logical address is recorded in plural, it is possible to correctly and easily reestablish the conversion table by using the old and new information.

The present disclosure is not limited to the above aspects, and can be implemented in a variety of aspects such as a configuration where a storage device is integrally incorporated in a computer apparatus or a data management method in a storage device using a flash memory.

BRIEF DESCRIPTION OF DRAWINGS

FIG. 4 illustrates a memory configuration in a flash memory;

FIG. 5 illustrates an example of a conversion table CT;

FIG. 10 illustrates an example of data in blocks B5 and B12;

FIG. 14 illustrates a save aspect of data in another illustrative embodiment.

DETAILED DESCRIPTION

A. First Illustrative Embodiment

Figure 1:
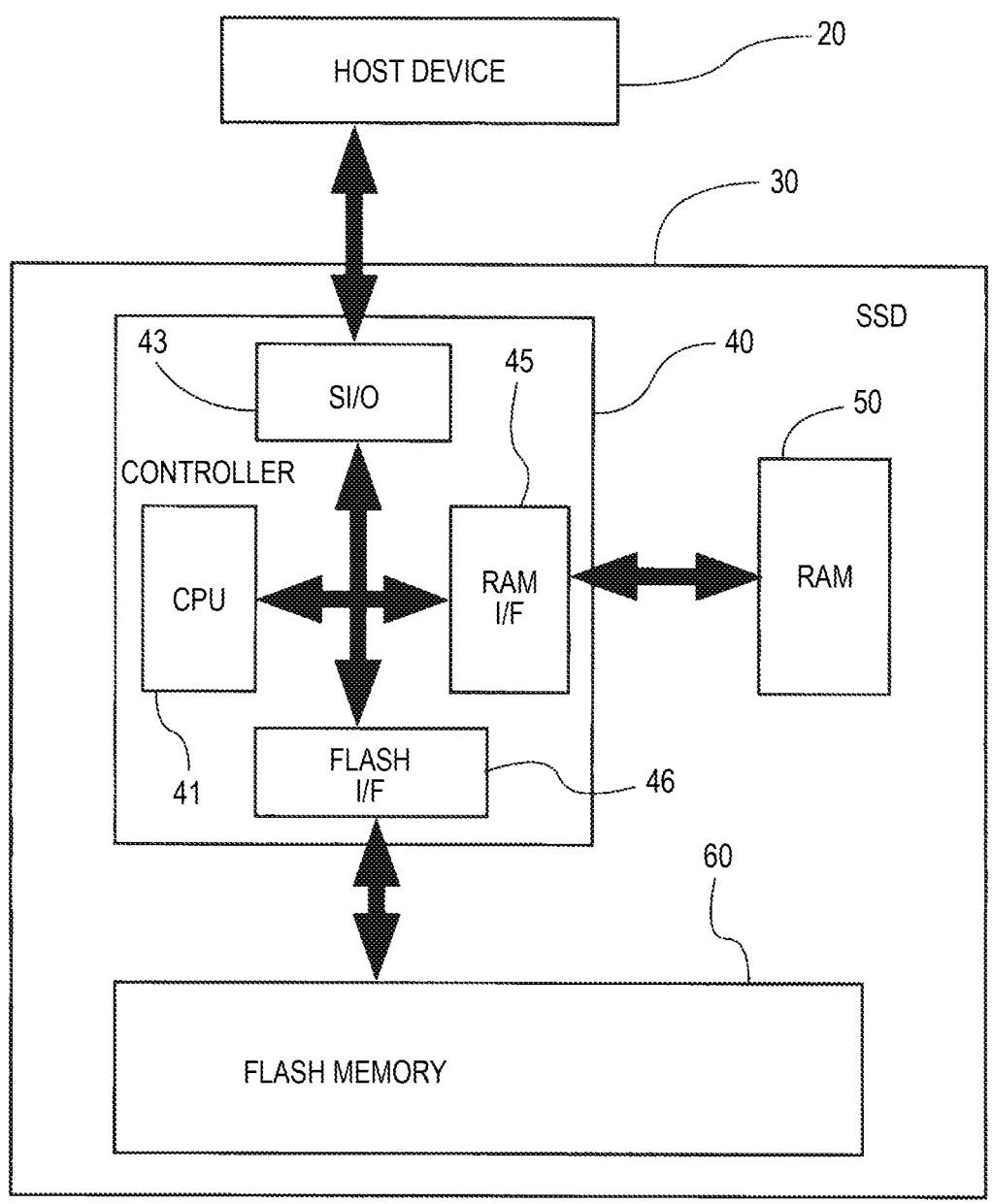
FIG. 1 is a schematic configuration view of an SSD of an illustrative embodiment.

A schematic configuration of a storage device 30 that is connected to a host device 20 such as a computer and is treated as one of external storage devices from the host device 20 is shown in FIG. 1. The storage device 30 is a so-called solid state device (hereinafter, referred to as 'SSD'). The host device 20 can save data in the SSD by using a file system, like a hard disk drive and the like.

As shown, the storage device 30 includes a controller 40 configured to control entire processing of the storage device 30, a RAM (abbreviation of Random Access Memory) 50 configured to temporarily store therein data, and a large-capacity non-volatile flash memory 60 configured to store therein data. The controller 40 includes a CPU 41 configured to execute a program embedded therein, a serial I/O (hereinafter, simply referred to as 'SI/O') 43 configured to transmit and receive information to and from the host device 20 via serial communication, a RAM interface (hereinafter, simply referred to as 'RAM I/F') 45 configured to transmit and receive data to and from the RAM 50, and a flash interface (hereinafter, simply referred to as 'flash I/F') 46 configured to transmit and receive data to and from the flash memory 60.

Figure 2:
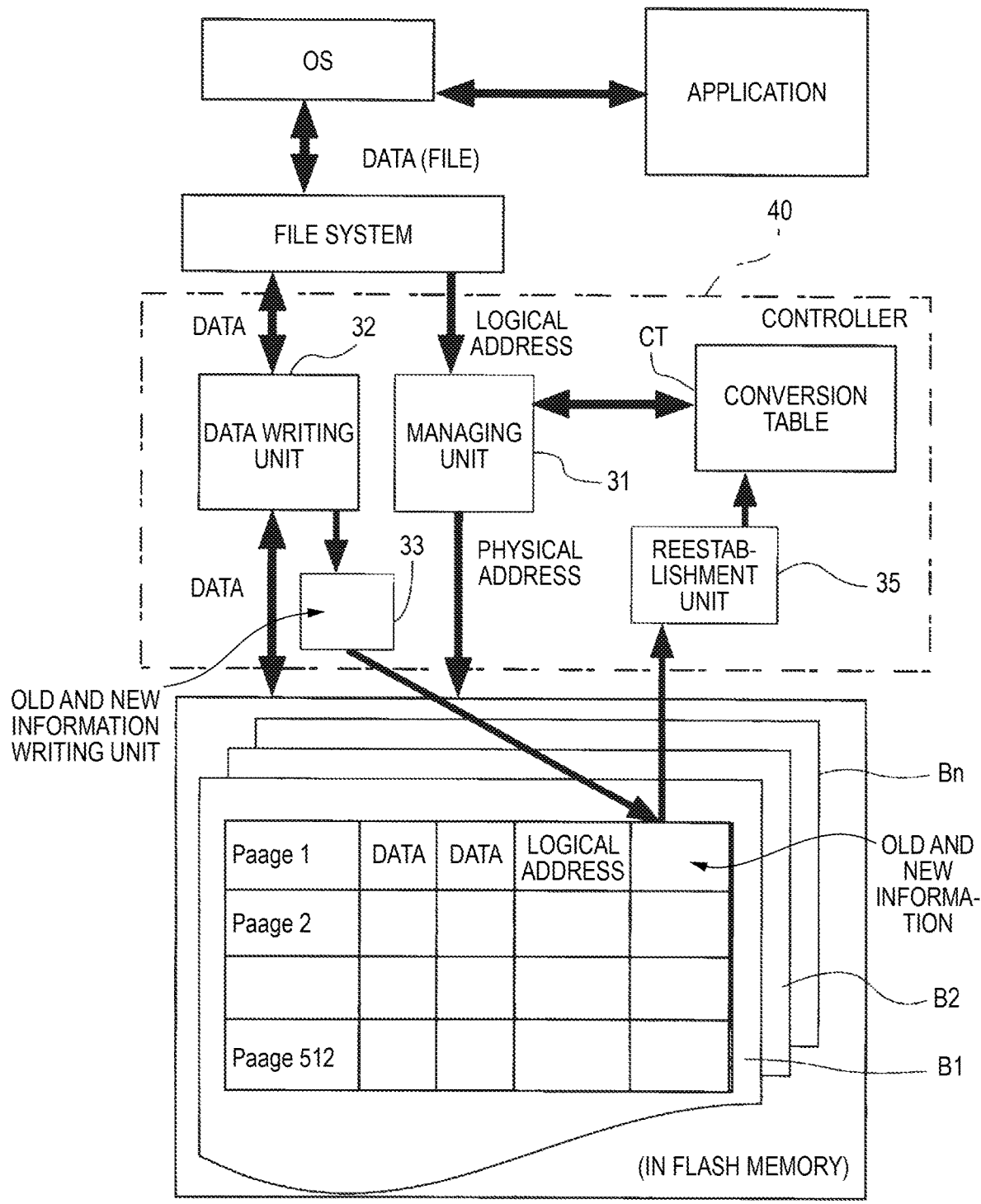
FIG. 2 illustrates a flow of writing and reading data to and from the SSD.

The storage device 30 is configured to operate as an external storage device of the host device 20. An outline of the operation is pictorially shown in FIG. 2. An application program in the host device 20 operates using an OS. The application program is configured to store data in a file format in the external storage device or to read out data from the external storage device by using a standard file system of the OS. The file system is configured to manage a file by a logical address. However, actual data is written in a specific page of a specific block in the flash memory 60. An address specified by the block or page of the flash memory 60 is a physical address. The controller 40 has a conversion table CT for converting the logical address and the physical address each other, and is configured to manage a save area of data by the conversion table CT. The conversion table CT operates on the RAM 50 while the storage device 30 is mounted and used, and is saved in a predetermined region of the flash memory 60 of the storage device 30 when the storage device 30 is inactivated. The storage device 30 is inactivated by ending the use of the storage device 30, for example. The ending of the use means unmounting of the storage device 30 when a power supply is turned off, for example. Upon activation of the storage device 30, the conversion table CT is read from the flash memory 60 into the RAM 50 and operates.

The controller 40 includes a managing unit 31 configured to convert the logical address and the physical address each other by referring to the conversion table CT, a data writing unit 32 configured to write data in a predetermined block and a predetermined page of the flash memory 60, an old and new information writing unit 33 configured to write, in a predetermined page of a block, latest old and new information of at least old and new information written in blocks upon completion of writing into a plurality of pages prepared in one block, a reestablishment unit 35 configured to reestablish the conversion table CT in case that the conversion table CT is damaged, and the like. The respective units may be implemented by hardware. However, in the first illustrative embodiment, the CPU 41 of the controller 40 executes a program embedded therein, so that processing of each unit is implemented. The processing in accordance with the program will be described in detail later.

An outline of a file writing routine that is to be executed by the CPU 41 of the controller 40 is described with reference to a flowchart of FIG. 3. The actual storage device 30 is configured to perform processing of equalizing a use frequency of each block so as to improve durability of the flash memory 60, for example. Since the processing is well known, the description thereof is omitted.

Figure 3:
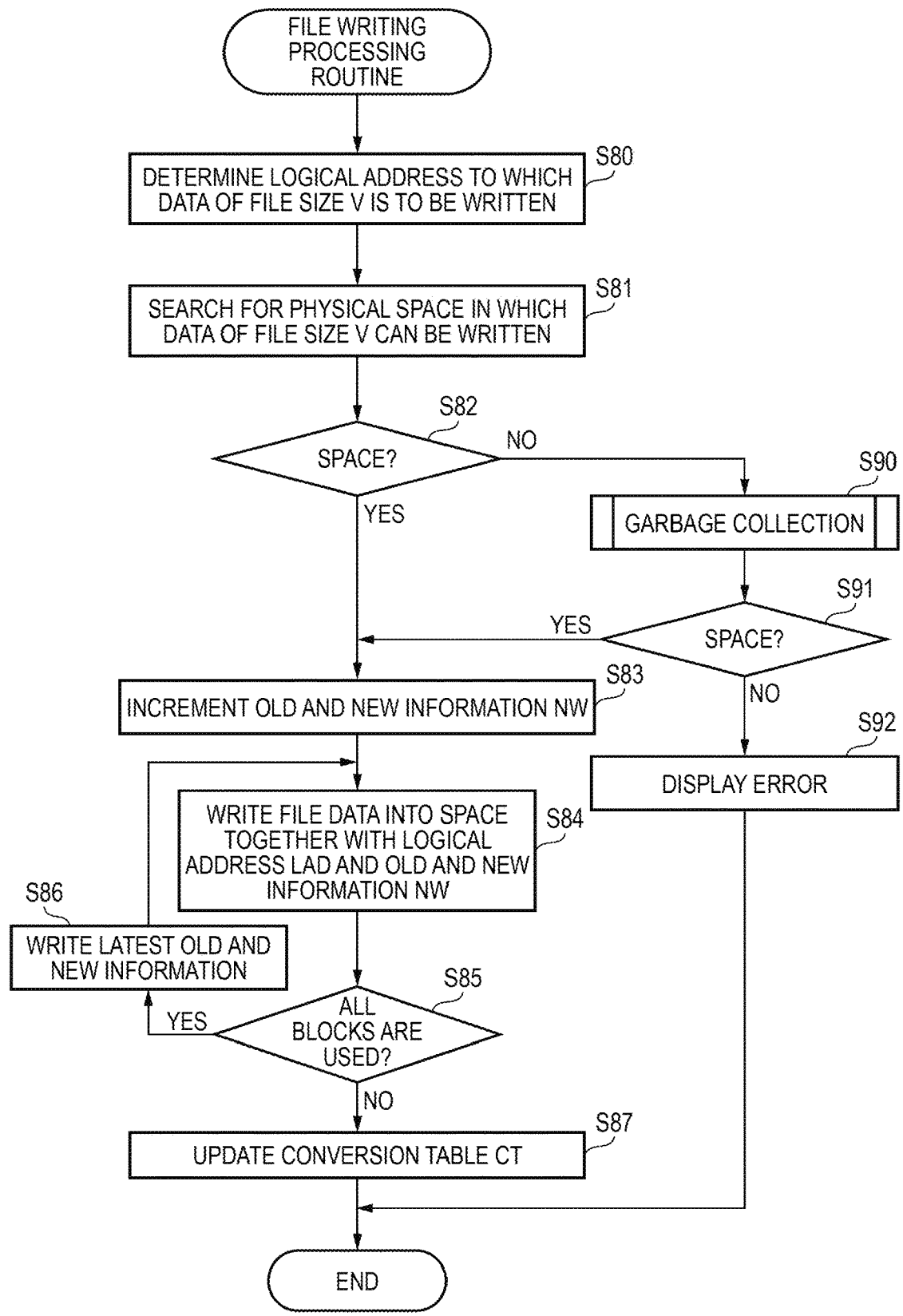
FIG. 3 is a flowchart depicting a file writing processing routine in the SSD of a first illustrative embodiment.

When a writing instruction of a predetermined file is received via the file system, the CPU 41 executes processing shown in FIG. 3. When the processing starts, the CPU 41 first determines a logical address that is used so as to write a file of a file size V (step S80). The reason is that although data is written and read out into and from the storage device 30 by using a physical address, the file system is configured to manage the writing and readout of the data by a logical address.

In step S80, when a logical address that is used so as to write the file is determined, the CPU 41 searches for a physical space for writing the data of the file size V (step S81). As shown in FIG. 4, the flash memory 60 of the first illustrative embodiment allots 512 pages of page 1 to page 512, each of which is a writing unit of data, to one block. Each page has a size of about 20K bytes, and 16K bytes thereof are divided into 4K bytes×4 parts, and are managed as a data part for saving data. A residual part of each page, i.e., the remaining 4K bytes are treated as a redundant part, and are used so as to store a checksum, an error-correcting code (ECC) and the like, for example. In the first illustrative embodiment, logical addresses and old and new information are further saved in the redundant part. The old and new information is a value of several tens of bits, and is a value that is monotonically increased (here, incremented by a value 1) whenever writing is performed page by page in the flash memory 60 after the use of the storage device 30 starts. That is, the old and new information is a value meaning whether the writing is old or new. A function and treatment of the old and new information will be described in detail later.

The block and page of the flash memory 60 shown in FIG. 4, which are used, are recorded in the conversion table CT. For this reason, the CPU 41 determines whether there is a space, in which the data of the file size V can be written, in a page and the like in which data has not been written yet by referring to the conversion table CT (step S82). When it is determined that there is the space, the CPU 41 increments the old and new information NW (step S83). Also, the CPU 41 writes the data in a physical address indicative of a region of the space, together with the logical address LAD and the old and new information NW (step S84). This is processing in which the data (4K bytes×4) of FIG. 4, the logical address LAD for each data of 4K bytes and the old and new information of the corresponding page are written page by page.

When the file size V is large, the entire data may not be written in one block. For this reason, the CPU 41 checks whether the writing has been completed in one block (step S85). Even though data is written up to one previous page (page 511, in the first illustrative embodiment) of a final page of a block, when data to be written remains, it is assumed that the writing has not been completed, and latest old and new information NBmx in the block is written in a last page (page 512) (step S86). Then, the CPU 41 returns to step S84, and continues to write the file. In the block, the data is written in order from a page of a smaller number. Therefore, the latest old and new information NBmx is the same as the old and new information of page 511.

When the writing of the data of the file size V is completed in this way, the CPU 41 updates the conversion table CT on the RAM 50 (step S87). Here, the update of the conversion table CT means additionally recording a relation between the logical address and the physical address of the newly written data. When the conversion table CT is updated, the CPU 41 proceeds to "END", so that this routine is finished.

An example of the conversion table CT is shown in FIG. 5. In this example, the physical address is simply displayed with respect to the logical address LAD, and is shown only with a block and a page at which writing of data starts. A reference numeral CK indicates that data corresponding to a logical address LADS, updated and written in any one page (for example, one of pages P31 to P64) of a block B5 as an initial physical address is written in a page P1 of a block B12. In this case, the pages P31 to P64 in which data is saved are excluded from the conversion table CT, and are separately managed as unusable pages.

On the other hand, when it is determined in step S82 there is no space for writing the data of the file size V, the CPU 41 performs garbage collection (step S90). As described above, a page in which data is rewritten and is thus unusable is registered as an unusable page in the conversion table CT. Therefore, when there is no new space for writing data, the CPU 41 performs the garbage collection so as to release the unusable page registered in the conversion table CT.

After preparing at least one spare block, the garbage collection is performed by a series of processing of:

[1] copying only effective data to the spare block from a block (referred to as 'erase block') that is a target of the garbage collection,

[2] erasing the erase block, block by block,

[3] registering a physical address of the original spare block in the conversion table CT, as a physical address of data registered in the erase block, and

[4] setting the original erase block, as a new spare block.

The CPU 41 repetitively executes the processing [1] to [4] for all the blocks in which there is a page registered as the unusable page, thereby releasing the unusable page. In the meantime, since the unusable page occurs at diverse positions of 512 pages existing in the block, when copying the data to the spare block, the data is written in order from a leading page. As a result, since a page number in which data is recorded is changed, a page number in the conversion table CT is also rewritten upon the garbage collection.

After completing the garbage collection in this way (step S90), the CPU 41 again checks whether there is a space for writing the data of the file size V (step S91). When it is determined that the space is secured, the CPU 41 proceeds to step S83 and executes the processing and thereafter of incrementing the old and new information NW (steps S83 to S87). On the other hand, when a space for writing the data of the file size V is not obtained even by the garbage collection, the CPU 41 displays an error "The disc capacity is full" (step S92), proceeds to "END" and ends this routine.

As described above, the data writing into the storage device 30 is performed using the logical address from the file system, and the data writing into the flash memory 60 of the storage device 30 is performed using the physical address having the block number and the page number. A correspondence relation between the logical address and the physical address is managed by the conversion table CT. In addition to this, the flash memory 60 is written with the data and the logical address and old and new information of the data, and when the data is written in all the pages (page 1 to page 511, here) of one block, the last page (page 512, here) is written with the latest old and new information NBmx saved in the block thereof.

On the premise of the data writing using the file system, conversion table reestablishment processing is performed. In the below, this processing is described with reference to FIG. 6. As described above, if the conversion table CT is not provided, the file system cannot read data from the storage device 30 by using a logical address. For this reason, the conversion table CT saved in the RAM 50 is saved in a predetermined region of the flash memory 60 when unmounting the storage device 30. Then, when the storage device 30 is mounted, the conversion table CT is read out and is saved in the RAM 50. However, a case where a power supply is abruptly interrupted before the storage device 30 is normally unmounted and the conversion table CT saved in the RAM 50 is not thus correctly saved in the predetermined region of the flash memory 60 may occur. Therefore, in the first illustrative embodiment, the conversion table CT is reestablished each time the use of the storage device 30 starts. In the below, a method thereof is described.

Figure 6:
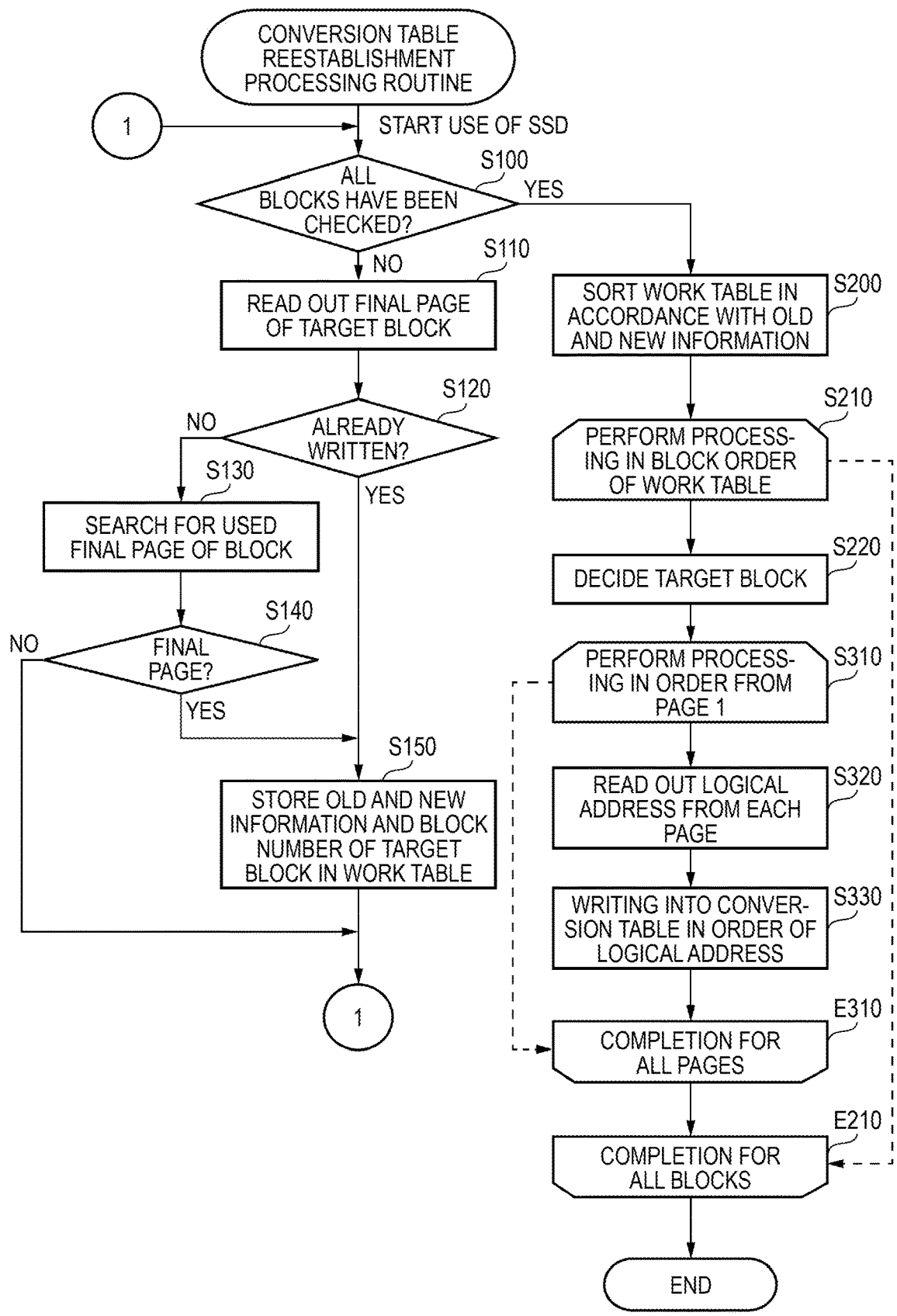
FIG. 6 is a flowchart depicting a conversion table reestablishment processing routine.

The processing shown in a flowchart of FIG. 6 starts at a timing at which the use of the storage device 30 starts, for example, power is supplied to the storage device 30. First, the CPU 41 determines whether the latest old and new information NBmx of all the blocks has been checked (step S100). Since a result of the determination in step S100 is "NO" immediately after the processing starts, the CPU 41 proceeds to step S110 and thereafter. In step S110, a final page of a target block is read out. Here, the target block means a block that is a processing target when processing blocks in order from a first block B1 to a last $n^{th}$ block Bn.

Then, the CPU 41 determines whether the latest old and new information NBmx has been already written in a final page (page 512, here) of the read target block (step S120). Since all data of a page, in which data has not been written, has a value upon erasing (normally, a value 1), it is possible to easily determine whether the latest old and new information NBmx has been already written by contents of the final page. When it is determined that the latest old and new information NBmx has been already written, each page of the target block is read in order from a leading page (or from a last page), and the used last page is searched as a final page (step S130). When data has been written in the final page (step S140), the latest old and new information NBmx and block number of the target block are stored in a work table WT (step S150).

At this time, for a block in which the latest old and new information NBmx has not been written in the final page (page 512, here), the old and new information of the searched last page is set as the latest old and new information NBmx. As shown in FIG. 4, in each block, data is written in order from a page of a smaller number. For this reason, when the page number is large, the old and new information also has a large value all the time. Therefore, the old and new information of the last page in which data is written may be treated as the latest old and new information NBmx of the corresponding block. On the other hand, when the final page is not searched in step S140, any processing is not performed because data has not been once saved in the target block. While the block number indicative of the target block is incremented in order from 1, the above processing is performed and the latest old and new information NBmx is saved in the work table WT.

Figure 7:
FIG. 7 illustrates an aspect of generating a sorted work table WTS from information in the flash memory.
Figure 7:
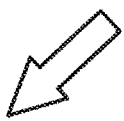

FIG. 7 depicts an example where the work table WT is prepared from the old and new information in the flash memory 60. An upper part of FIG. 7 indicates the block number and the latest old and new information NBmx in the flash memory 60, and a middle part indicates the prepared work table WT. In FIG. 7, "N/A" indicates that data has not been once written in the corresponding block. Therefore, the latest old and new information NBmx is not read out from the corresponding block, and is not registered in the work table WT.

When a result of the determination in step S140 is "NO" or after the processing of step S150 is finished, the processing proceeds to step S100. Then, the processing of steps S110 to S150 is repetitively performed for all the blocks. When the latest old and new information NBmx has been checked for all the blocks (step S100: "YES"), processing of sorting the work table WT in accordance with the old and new information is performed (step S200). An example of a sorted work table WTS obtained by the sorting is shown in a lower part of FIG. 7.

Subsequently, following processing is repetitively performed for all the blocks registered in the work table WTS by using the sorted work table WTS (steps s210 to e210). In the processing to be repetitively performed, a target block is first decided (step S220). That is, the block number is read out in order from the upper in the sorted work table WTS, and following processing is performed.

When the block number is decided, following processing is repetitively performed from page 1 to a final page in the corresponding block (steps s310 to e310). In the processing to be repetitively performed, a logical address is first read out from each page (step S320), the read logical address and a physical address corresponding to the logical address are written in order of the logical address in the conversion table CT (step S330). As a result, the physical addresses corresponding to the logical addresses are aligned in accordance with the logical address.

The above processing is repetitively performed for all the pages and for all the blocks. At this time, the processing is performed in order from the block of which the value of the latest old and new information NBmx is smaller (refer to FIG. 7 and the sorted work table WTS). For this reason, even if a page having the same logical address is read out, the newly read physical address may be overwritten on the logical address and physical address read out already. Also, since data is written in order from page 1 in the flash memory 60, the smaller the page number is, each page in one block has the smaller old and new information. Therefore, when the processing is performed in order from page 1, even though the same logical address appears, if the newly read physical address is overwritten on the logical address and physical address read out already, the data is rewritten by a combination of the correct logical address and physical address.

The above processing is repetitively performed, so that the combinations of the logical addresses and physical addresses read out from all the pages of all the blocks are recorded in the conversion table CT. Thereafter, the file system converts the logical address and the physical address by using the conversion table CT saved in the RAM 50, so that it can write data configuring a file into the flash memory 60 and read out the same from the flash memory 60.

According to the first illustrative embodiment as described above, when recording data in the storage device 30, the logical address and old and new information of the data are recorded together with the data, and the latest old and new information NBmx in each block is recorded in the final page of each block of the flash memory 60. Then, when the storage device 30 is mounted, the latest old and new information NBmx of each block is read out, and each block is aligned in order of the latest old and new information NBmx. The combinations of the logical address and physical address, which are read out in order from the block having the smaller latest old and new information NBmx to the block having the larger latest old and new information NBmx, configure the conversion table CT. Since each block is aligned in accordance with the latest old and new information NBmx, the combination of the logical address and physical address simply recorded in each page has only to be recorded in order of the logical address in the conversion table CT, so that the conversion table CT is configured in a short time.

Further, in the first illustrative embodiment, a table consisting of a set of the logical address and physical address, which has been used in the related art, is used as the conversion table CT. Therefore, it is not necessary to add special new information to the conversion table CT.

In the first illustrative embodiment, the conversion table CT is reestablished each time the use of the storage device 30 starts. However, the conversion table CT may be reestablished only when it is determined that the use of the storage device 30 is not normally ended. For example, a configuration may be adopted in which the conversion table CT is saved in a system area of the flash memory 60 at an unmounting timing, for example, and then when the use of the storage device 30 starts, it is determined whether the conversion table CT saved in the system area is saved as the use of the storage device 30 is normally ended, and the conversion table CT is reestablished only when it is determined that the conversion table CT is not saved as the use of the storage device 30 is normally ended. In this case, when it is determined that the conversion table CT is saved as the use of the storage device 30 is normally ended, the conversion table CT may be used as it is without the processing of reestablishing the conversion table CT. For example, when the use of the storage device 30 starts, data corresponding of the use start is additionally recorded to an end of a predetermined area of the flash memory 60, and when the use of the storage device 30 is ended, the conversion table CT is saved and then data corresponding to the use ending is additionally recorded to the end of the predetermined area of the flash memory 60, so that it is possible to determine whether the use of the storage device 30 is normally ended. That is, upon the activation, the data recorded in the end of the predetermined area may be read out to determine whether the data is data corresponding to the use start or data corresponding to the use ending. When the data is data corresponding to the use ending, since it is determined that the use of the storage device 30 is normally ended, the recorded conversion table CT may be used as it is. By the processing, it is possible to reduce the number of times of reestablishment of the conversion table CT.

B. Second Illustrative Embodiment

Figure 8:
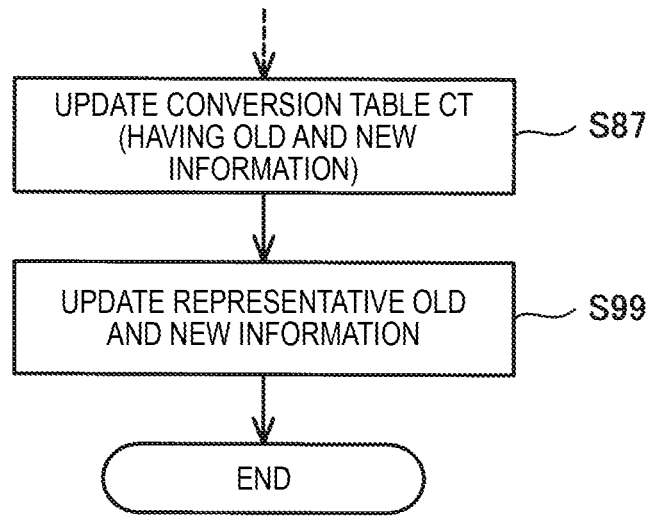
FIG. 8 is a flowchart depicting of main parts of a file writing processing routine of a second illustrative embodiment.

Subsequently, a second illustrative embodiment is described. The storage device 30 of the second illustrative embodiment has the same hardware configuration as the storage device 30 of the first illustrative embodiment, and is different from the first illustrative embodiment in terms of the format of the conversion table and the processing of reestablishing the conversion table. In the storage device 30 of the second illustrative embodiment, the processing of step S87 of the file writing processing routine shown in FIG. 3 is different, and processing of step S99 is thereafter performed. The corresponding processing is shown in FIG. 8.

Figure 9:
FIG. 9 illustrates a conversion table CT of the second illustrative embodiment.

In the second illustrative embodiment, in the processing (FIG. 3) of writing the file data, after data is written in a predetermined physical address, the conversion table CT is updated (step S87). However, at that time, the old and new information is also saved, in addition to the combination of the logical address and physical address. This example is shown in FIG. 9. In the second illustrative embodiment, in the conversion table CT, the old and new information is registered, in addition to the logical address and the physical address (the block number and the page number).

In the example of FIG. 9, a logical address LAD8 is updated, and data recorded in page P4 of a block B5 is transferred to page P1 of a block B12 and the old and new information is also updated by the update. In this case, the block B5 and the block B12 are shown in detail in FIG. 10. As shown, in page P4 of the block B5, the logical address LAD8 and a value 8, which is the old and new information, are written together with data DATA4. Thereafter, when rewriting the data of the logical address LAD8, it is not possible to rewrite the same only by a part of the data written in the flash memory 60. Therefore, the data DATA4 recorded to the logical address LAD8 is saved in page P1 of the block B12 and a value 154, which is new old and new information corresponding to the data DATA4, is saved. As a result, the same logical address is recorded in a plurality of pages in the flash memory 60. Whether data written in any page of the plurality of pages is up to date is determined by a comparison result of the old and new information but cannot be determined only by the information of each page.

In the second illustrative embodiment, after the conversion table CT is updated in step S87, the processing proceeds to step S99, so that representative old and new information NWa is updated. The representative old and new information NWa means old and new information having a maximum value through all the pages of all the blocks. As shown in step S83 of FIG. 3, since the old and new information is incremented when writing data into the flash memory 60 page by page, the representative old and new information NWa is the same as the old and new information when finally writing the data at that point of time. As shown in FIG. 9, the old and new information (a value 1523, here) associated with a logical address LADn and a physical address (a block number Bn and a page number Pn) at the time that data is finally written is written into a predetermined region of the conversion table CT, as the representative old and new information NWa.

Figure 11:
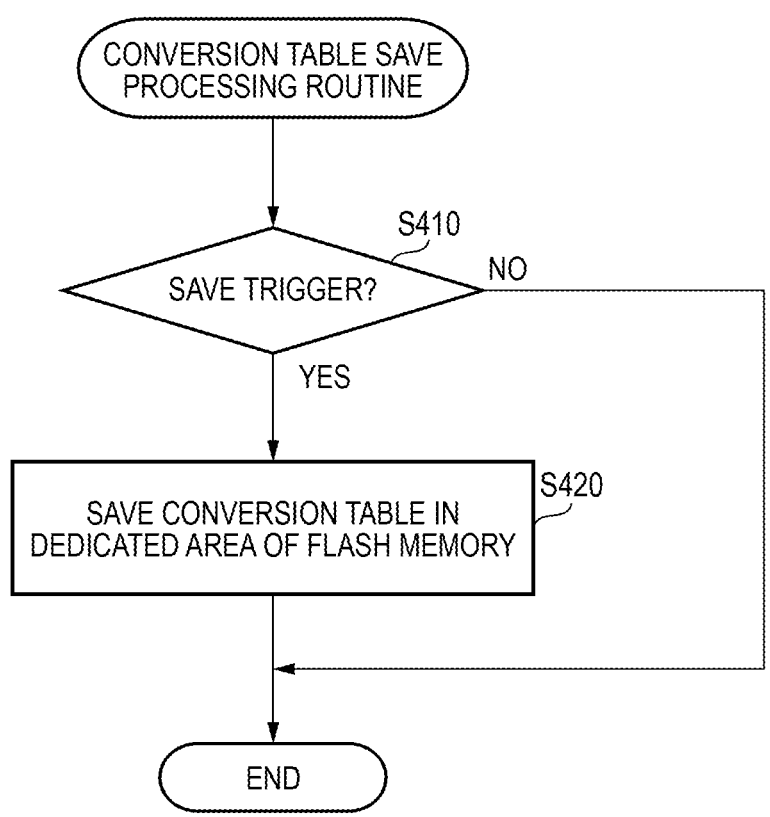
FIG. 11 is a flowchart depicting a conversion table save processing routine.

As described above, in the second illustrative embodiment, the old and new information is stored in the conversion table CT in association with the combination of the logical address and physical address, and the representative old and new information NWa is also stored. Also, in the second illustrative embodiment, as shown in FIG. 11, the conversion table CT is saved in a predetermined region of the flash memory 60. That is, the CPU 41 of the controller 40 determines whether a save trigger has occurred (step S410). For example, when a request "the storage device 30 is to be unmounted" occurs, the CPU 41 detects the request as the save trigger and saves the conversion table CT in the system area of the flash memory 60 (step S420). In addition to this, the save trigger may occur every predetermined time or each time a predetermined capacity of data is saved. As a result, when the save trigger such as unmounting occurs, the latest conversion table CT including the combinations of the logical address and physical address shown in FIG. 9, the old and new information corresponding to the combinations and the representative old and new information NWa is stored in the system area of the flash memory 60.

The activation processing of the storage device 30 of the second illustrative embodiment, which is operated on the premise of the above processing, is described with reference to FIG. 12. The storage device 30 is activated when the power is supplied to the storage device 30, when the unmounted storage device 30 is mounted, and the like. First, it is determined whether the storage device 30 is activated as the power is supplied thereto (step S500). When it is determined that the storage device 30 is activated as the power is supplied thereto (step S500: "YES"), the latest conversion table CT is read out from the system area of the flash memory 60 and is developed into the RAM 50 (step S510), and then the processing proceeds to step S520. Otherwise, since the conversion table CT has been already developed into the RAM 50, the processing proceeds to step S520 without any processing.

In step S520, the representative old and new information NWa is acquired from the conversion table CT developed in the RAM 50. Then, the maximum value of the latest old and new information NBmx saved in each block of the flash memory 60 is acquired as representative old and new information NWb stored in a user area of the flash memory 60. The latest old and new information NBmx has been described in detail in the first illustrative embodiment.

Then, both the two representative old and new information NWa and NWb acquired as described above is compared (step S540). When it is determined that both the information is the same, it is determined that the conversion table CT is the latest table and there is no error in the contents thereof, and this activation processing routine is finished. Thereafter, the reading and writing of data with respect to the file system is performed using the conversion table CT developed in the RAM 50.

On the other hand, when it is determined that the two representative old and new information NWa and NWb does not coincide with each other, processing of reestablishing the conversion table CT (step S600) is performed. Here, as the case where both the information does not coincide with each other, a case where the power supply to the storage device 30 is forcibly interrupted may be exemplified. In this case, since the conversion table CT being used is not saved in the system area of the flash memory 60, inconsistency is caused in both the information. Therefore, in this case, it is necessary to reestablish the conversion table CT. This is the reestablishment processing (step S600).

Figure 13:
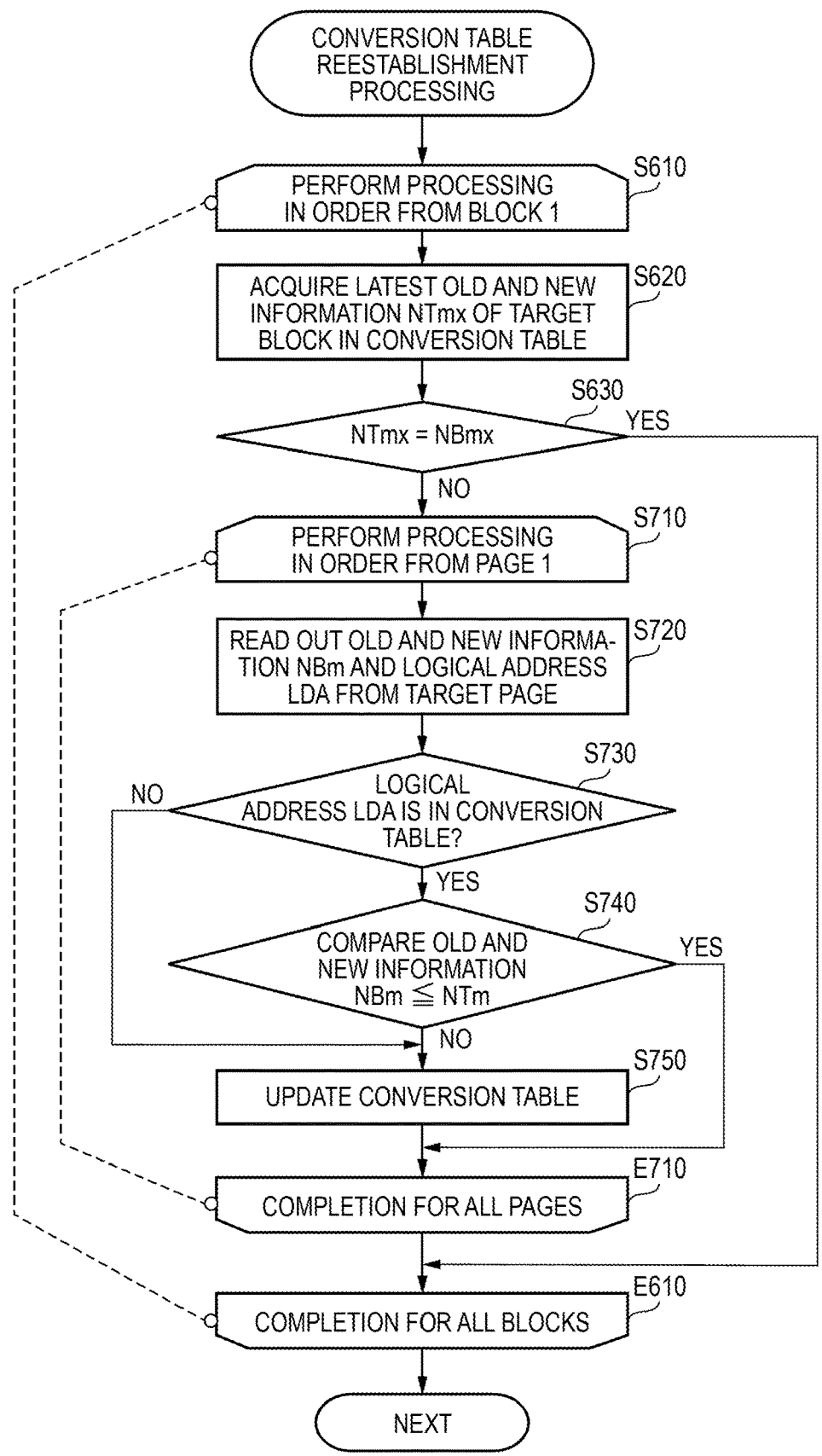
FIG. 13 is a flowchart depicting a conversion table reestablishment processing.

The reestablishment processing of the conversion table CT is shown in FIG. 13. When this processing starts, following processing (steps s610 to e610) is repetitively performed for all the blocks in order from block 1. In this processing to be repetitively performed, latest old and new information NTmx of a target block in the conversion table CT is first acquired (step S620). As exemplified in FIG. 9, the conversion table CT is not integrated for each block but is stored in the RAM 50. For this reason, when the conversion table CT is searched, the old and new data having the largest value, i.e., the latest old and new data NTmx is easily specified from each block.

Then, processing of comparing the latest old and new information NTmx of the block obtained from the conversion table CT and the latest old and new information NBmx saved in the final page of each block is performed (step S630). As a result of the comparison, when both the information coincides with each other, since it is determined that the combination of the logical address and physical address relating to the target block in the conversion table CT is up to date, the processing proceeds to an end of the processing to be repetitively performed without any processing. When the processing for all the blocks is not finished, the processing of steps s610 to e610 is again executed for a next target block number.

On the other hand, when a result of the determination in step S630 is "NO", since the latest old and new information NTmx stored in the conversion table CT and the latest old and new information NBmx recorded in the block are different from each other, it is determined that there is an error in the contents of the conversion table CT relating to the block. As a result, following processing (steps s710 to e710) is repetitively performed in order from page 1 of the block.

In the processing to be repetitively performed, the old and new information NBm and a logical address LDA are first read out from a target page in a target block of the flash memory 60 (step S720). As exemplified in FIG. 4, the old and new information NBm and the logical address LDA of each page are recorded in the redundant part of each page. Then, it is determined whether the read logical address LDA is recorded in the conversion table CT (step S730). When it is determined that the read logical address LDA is not recorded in the conversion table CT, the processing proceeds to update processing (step S750) of the conversion table CT. The update processing of step S750 will be described later. On the other hand, when it is determined that the read logical address LDA is included in the conversion table CT (step S730: "YES"), the old and new information is compared each other (step S740). Specifically, it is determined whether the old and new information NTm associated with the logical address LDA stored in the conversion table CT is the same as or larger than the old and new information NBm, which has read out from the target page in the target block together with the logical address. When it is determined that the old and new information NTm stored in the conversion table CT is a value equal to or larger than the old and new information NBm, it is determined that the information in the conversion table CT is right, and any processing is not performed (step S740: "YES"). On the other hand, when the old and new information NTm in the conversion table CT is smaller than the old and new information NBm (step S740: "NO") or the read logical address LDA is not stored in the conversion table CT, as described above (step S730: "NO"), it is determined that the information in the conversion table CT is not normal, and the conversion table CT is updated (step S750).

Here, the update processing (step S750) of the conversion table CT is performed as follows.

(A) When the logical address LDA read out from the target page in the target block is not stored in the conversion table CT, the read logical address and the physical address thereof are stored in the conversion table CT in association with each other.

(B) When the old and new information NTm stored in the conversion table CT is smaller than the old and new information NBm read out from the target page in the target block, it is determined that the old and new information in the conversion table CT is old and the old and new information recorded in the target page of the target block of the flash memory 60 is right. Then, the physical address (the block number and the page number) of the conversion table CT is rewritten by the actual physical address (the block number and the page number) of the flash memory 60 in which the old and new information NBm is recorded, and the old and new information NTm stored in the conversion table CT is replaced with the old and new information NBm.

The above processing (steps s710 to e710) is sequentially repeated for all the pages of the target block. When the processing is executed for all the pages, the same processing is repetitively performed from a next target block to a final block (steps s610 to e610).

In this way, in the second illustrative embodiment, when reestablishing the conversion table CT, the above processing is repetitively performed for all the pages of all the blocks. When it is determined in step S630 that the latest old and new information NTmx stored in the conversion table CT and the latest old and new information NBmx recorded in the block of the flash memory 60 coincide with each other, the processing relating to the pages included in the corresponding block is not performed, so that the processing of reestablishing the conversion table CT is finished in a short time.

Figure 12:
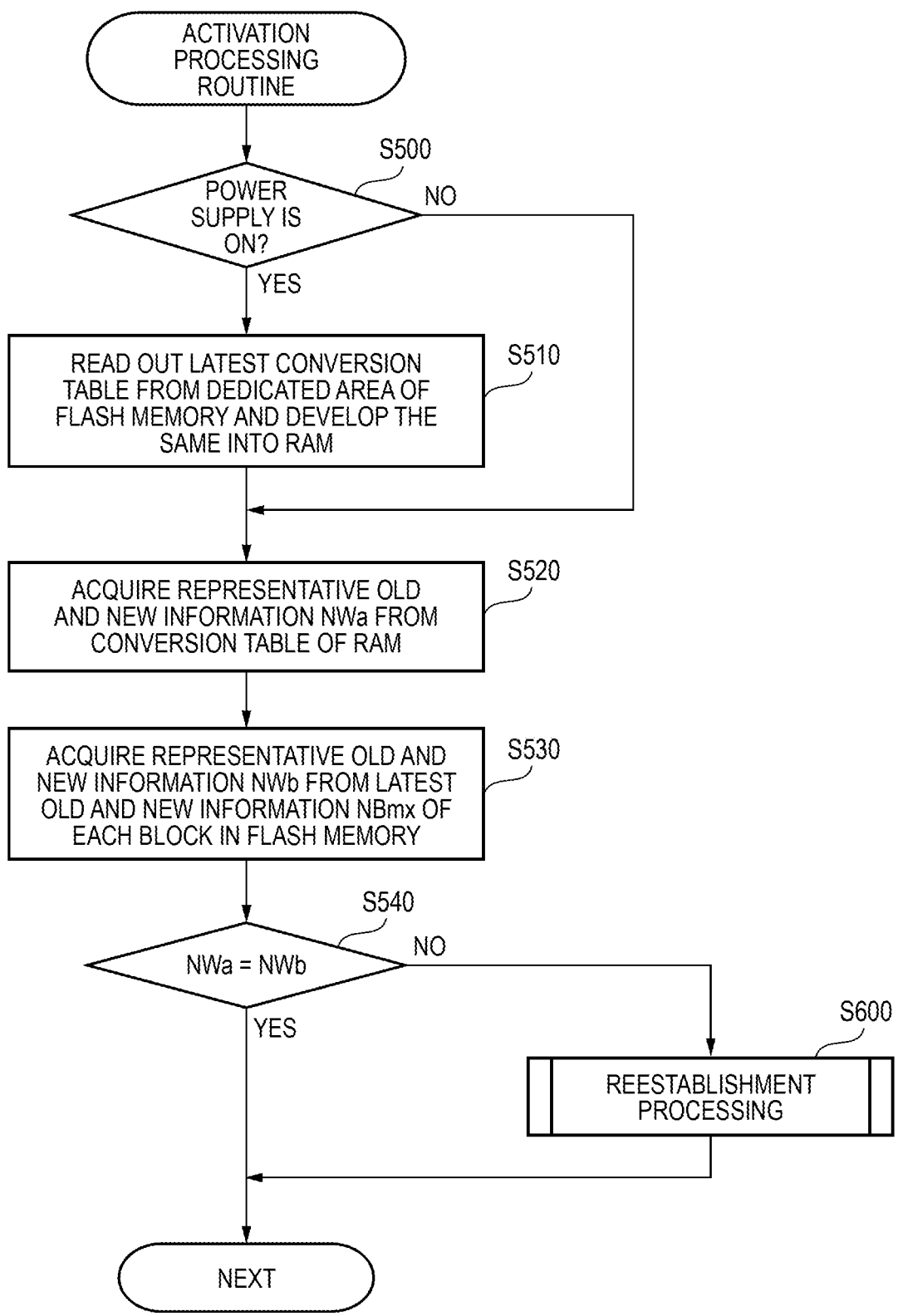
FIG. 12 is a flowchart depicting an activation processing routine.

Also, in the second illustrative embodiment, as shown in FIG. 12, upon the activation of the storage device 30, it is determined whether the representative old and new information NWa of the conversion table CT and the representative old and new information NWb recorded in the flash memory 60 coincide with each other. When it is determined that both the information coincides with each other, the reestablishment processing is not performed. Therefore, it is not necessary to reestablish the conversion table CT each time the storage device 30 is activated.

C. Other Illustrative Embodiments

In the first and second illustrative embodiments, when reestablishing the conversion table CT, the contents of each page in each block are read out, such as the repetitive execution of steps s310 to e310 of FIG. 6 and the repetitive execution of steps s710 to e710 of FIG. 13. Therefore, when the writing is performed up to one previous page of the final page of each block, the data recorded in the redundant parts of all the pages so far (page 1 to page 511, here) may be integrally written in the final page (page 512, here). This is shown in FIG. 14. By doing so, the information of the target block is collectively read out from the final page. In the meantime, the information to be recorded in the final page may be all of the logical addresses and the old and new information recorded in the redundant parts or may be digest data obtained by compressing the same. As the digest data, for example, data, which is recorded as formats of an initial value and a differential value, may be used inasmuch as the logical addresses and the old and new information have continuous numbers.

In the respective illustrative embodiments, the value that is sequentially incremented is used as the old and new information. In another illustrative embodiment, the old and new information may be recorded using system time. The system time is time that is always counted without being reset in the host device to be used. Alternatively, a backup power supply may be provided in the storage device 30, a real time clock that is not to be reset may be mounted, and information of time that is to be generated from the real time clock may be used as the old and new information.

In addition, the present disclosure can be implemented as follows. In one aspect, the reestablishment unit 35 may be configured to read out the old and new information written in a page included in a block, for which the writing by the old and new information writing unit 33 is not performed, and to treat the latest old and new information of the read old and new information, as the latest old and new information relating to the corresponding block.

Alternatively, the managing unit 31 may be provided with a conversion table writing unit configured to record the conversion table CT in a predetermined region of the flash memory 60 at a timing including a timing at which the use of the storage device 30 is ended, and the reestablishment unit 35 may be configured to determine that it is a reestablishment timing when it is not determined that the conversion table CT recorded in the predetermined region of the flash memory 60 is normal, and to reestablish the conversion table CT.

Also, in the second illustrative embodiment, a configuration is also possible in which at least upon the use start of the storage device 30, the newest old and new information NWa of the old and new information of the conversion table CT recorded in the flash memory 60 and the newest old and new information NWb of the old and new information recorded in each page or each block of the flash memory 60 are compared and when both the old and new information does not coincide with each other, the conversion table CT is not determined as normal.

Also, the conversion table writing unit may be configured to record the conversion table CT in a predetermined region of the flash memory 60 at a predetermined timing during the use of the storage device 30, in addition to a timing at which the use of the storage device 30 is ended.

Also, a collective writing unit that collectively writes the logical address and the old and new information, which are written when data is written page by page, into a predetermined page of a block when data writing into the flash memory 60 block by block is completed may be provided, and the reestablishment unit 35 may be configured to read out the collectively written logical address and old and new information upon the reestablishment and to treat the same as the logical address and old and new information recorded page by page or block by block in the flash memory 60.

In addition, the conversion table writing unit may be configured to record, as the representative old and new information, the newest old and new information of all the old and new information stored in the conversion table CT into a predetermined region of the flash memory 60 upon recording of the conversion table CT into the predetermined region, and the reestablishment unit 35 may be configured to read out and use the representative old and new information recorded in the predetermined region, as the newest old and new information of the old and new information of the conversion table CT recorded in the flash memory 60, upon comparison of the old and new information.

In the above illustrative embodiments, the storage device 30 is treated as the external storage device of the host device 20. However, the storage device 30 may be integrally incorporated in a computer. Also, the storage device 30 may be used by a combination of a data logger, a portable phone, a digital camera and the like.

The first and second illustrative embodiments may be treated as an implementation of a data management method that is to be performed when a storage device having a flash memory, which is configured to erase data stored as a non-volatile data block by block, the block having a plurality of pages, and can write and read out the data page by page, is accessed from a host device by using a logical address.

What is claimed is:

1. A storage device configured to be accessed using a logical address by a host device, the storage device comprising:
a flash memory comprising a plurality of blocks and configured to erase data stored as a non-volatile data block by block among the plurality of blocks, each of the plurality of blocks comprising a plurality of pages, and to write or read out the data page by page among the plurality of pages; and circuitry configured to:
  manage a logical address among a plurality of logical addresses corresponding to the data to be written page by page into the flash memory and a physical address to be managed in association with a block among the plurality of blocks and a page among the plurality of pages allotted to the block into which the data is written so that the logical address and the physical address can be converted using a conversion table, the data being written into the physical address;
  when writing the data into the physical address of the flash memory, write the logical address, which is to be stored in the conversion table in association with the physical address, and old and new information, which indicates a timing when the data is written, into the physical address together with the data;
  when writing into the plurality of pages allotted to the block is completed, write at least latest old and new information of the old and new information written into the block into a predetermined one of the plurality of pages allotted to the block; and
  reestablish the conversion table by arranging one of the plurality of logical addresses recorded in each of the plurality of pages allotted to the block and the physical address corresponding to the logical address in association with each other, in order of a value of the old and new information, at a predetermined reestablishment timing for reestablishing of the conversion table.

2. The storage device according to claim 1, wherein the circuitry is further configured to:
  read out, from one of the plurality of blocks for which writing has not been performed by the circuitry, the old and new information written in a page included in the one of the plurality of blocks for which the writing has not been performed by the circuitry; and
  treat latest old and new information of the read old and new information, as latest old and new information relating to the one of the plurality of blocks for which the writing has not been performed by the circuitry.

3. The storage device according to claim 2, wherein the circuitry is further configured to record the conversion table into a predetermined region of the flash memory at a timing comprising a timing at which the storage device is inactivated, and
  when it is not determined that the conversion table recorded in the predetermined region of the flash memory is normal, the circuitry determines that the predetermined reestablishment timing occurs, and reestablishes of the conversion table.

4. The storage device according to claim 1, wherein the circuitry is further configured to record the conversion table into a predetermined region of the flash memory at a timing comprising a timing at which the storage device is inactivated, and
  when it is not determined that the conversion table recorded in the predetermined region of the flash memory is normal, the circuitry determines that the predetermined reestablishment timing occurs, and reestablishes of the conversion table.

5. The storage device according to claim 4, wherein the circuitry is further configured to record the conversion table into the predetermined region of the flash memory at a predetermined timing during use of the storage device, in addition to a timing at which the storage device is inactivated.

6. The storage device according to claim 3, wherein the circuitry is further configured to:
  record, as representative old and new information, latest old and new information in the conversion table into the predetermined region of the flash memory upon recording of the conversion table into the predetermined region of the flash memory; and
  read out and use, as the latest old and new information, the representative old and new information, which is recorded in the predetermined region, upon comparison of the representative old and new information with the old and new information written into the predetermined one of the plurality of pages.

7. The storage device according to claim 1, wherein the circuitry is further configured to:
  collectively write the logical address and the old and new information, which are written together with data written page by page, into the predetermined page of the block when data writing into the flash memory block by block is completed; and
  treat the logical address and old and new information, which are collectively written in the predetermined page of the block and are read out upon the reestablishment, as the logical address and old and new information recorded page by page or block by block in the flash memory.

8. A computer apparatus having the storage device according to claim 1 incorporated therein and configured to access data of the storage device by using the logical address.

9. The storage device according to claim 1, wherein when data to be written remains even though data is written up to one previous page of a final page of the plurality of pages allotted to the block by the circuitry, the circuitry writes the latest old and new information in the block into the final page.

10. The storage device according to claim 1, wherein the circuitry is further configured to treat old and new information of a final page in which the data is written, as the latest old and new information of the block.

11. The storage device according to claim 1, wherein the reestablishment of the conversion table by the circuitry comprises:
  reading out the logical address recorded in each page included in each block in said order; and
  writing the logical address in the conversion table in association with the physical address, and
  when a page having a same logical address as the logical address is newly read out in the reading out the logical address, the circuitry writes a physical address corresponding to the newly read page over the physical address associated with the logical address.

12. The storage device according to claim 1, wherein a value that is sequentially incremented whenever writing is performed is used as the old and new information.

13. The storage device according to claim 1, wherein system time is used as the old and new information, the system time being time that is always counted without being reset in the host device.

14. A storage device configured to be accessed using a logical address by a host device, the storage device comprising:
  a flash memory comprising a plurality of blocks and configured to erase data stored as a non-volatile data block by block among the plurality of blocks, each of the plurality of blocks comprising a plurality of pages, and to write or read out the data page by page among the plurality of pages; and circuitry configured to:

manage a logical address corresponding to the data to be written page by page into the flash memory, a physical address to be managed in association with a block among the plurality of blocks and a page among the plurality of pages allotted to the block into which the data is written, and old and new information, which indicates a timing when the data is written, by using a conversion table, the data being written into the physical address;

when writing the data into the physical address of the flash memory, write the logical address, which is to be stored in the conversion table in association with the physical address, and the old and new information, which is to be stored in the conversion table, into the physical address together with the data;

when inactivating the storage device, record the conversion table into a predetermined region of the flash memory; and when it is not determined that the conversion table recorded in the predetermined region of the flash memory is normal, compare a first version of the old and new information, which is recorded page by page or block by block in the flash memory and corresponds to said logical address, and a second version of the old and new information, which is included in the conversion table recorded in the flash memory and corresponds to said logical address, and reestablish the conversion table.

15. The storage device according to claim 14, wherein at least when the use of the storage device starts, the second version of the old and new information of the old and new information included in the conversion table recorded in the flash memory and the first version of the old and new information of the old and new information recorded in each page or each block of the flash memory are compared, and when the two versions of the old and new information do not coincide with each other, the conversion table is not determined as normal.

16. The storage device according to claim 14, wherein the circuitry is further configured to record the conversion table into the predetermined region of the flash memory at a predetermined timing during use of the storage device, in addition to a timing at which the storage device is inactivated.

17. The storage device according to claim 14, wherein the circuitry is further configured to:

record, as representative old and new information, latest old and new information of the second version of the old and new information stored in the conversion table into the predetermined region of the flash memory upon recording of the conversion table into the predetermined region; and read out and use, as latest old and new information, the representative old and new information, which is recorded in the predetermined region, upon comparison of the first version and the second version of the old and new information.

18. The storage device according to claim 14, wherein the circuitry is further configured to:

collectively write the logical address and the old and new information from the reestablishment, which are written together with the data written page by page, into a predetermined page of the block when data writing into the flash memory block by block is completed, treat the logical address and old and new information from the reestablishment, which are collectively written in the predetermined page of the block and are read out upon the reestablishment, as the logical address and old and new information recorded page by page or block by block in the flash memory.

19. A computer apparatus having the storage device according to claim 14 incorporated therein and configured to access data of the storage device by using the logical address.

20. A data management method that is to be performed when a storage device having a flash memory comprising a plurality of blocks, which is configured to erase data stored as a non-volatile data block by block among the plurality of blocks, each of the plurality of blocks having a plurality of pages, and to write or read out the data page by page among the plurality of pages, is accessed from a host device by using a logical address among a plurality of logical addresses, the data management method comprising:

managing, using circuitry, the logical address corresponding to the data to be written page by page into the flash memory and a physical address to be managed in association with a block among the plurality of blocks and a page among the plurality of pages so that the logical address and the physical address can be converted using a conversion table, the data being written into the physical address;

when writing the data into the physical address of the flash memory, writing the logical address, which is to be stored in the conversion table in association with the physical address, and old and new information, which indicates a timing when the data is written, into the physical address allotted page by page together with the data;

when writing into the plurality of pages allotted to the block is completed, writing at least latest old and new information of the old and new information written in the block into a predetermined page one of the plurality of pages allotted to the block; and reestablishing the conversion table by arranging one of the plurality of logical addresses recorded in each of the plurality of pages allotted to the block and a physical address corresponding to the one of the plurality of logical addresses in association with each other, in order of a value of old and the new information, at a predetermined reestablishment timing for reestablishing of the conversion table.

* * * * *